United States Patent [19]
Wang et al.

[11] Patent Number: 6,119,079
[45] Date of Patent: Sep. 12, 2000

[54] METHOD AND STRUCTURE FOR TOKENIZED MESSAGE LOGGING SYSTEM

[75] Inventors: Lanzhong Wang; Charles W. Cairns, Jr., both of Fort Collins, Colo.

[73] Assignee: Hewlett-Packard Company, Palo Alto, Calif.

[21] Appl. No.: 08/842,460

[22] Filed: Apr. 24, 1997

[51] Int. Cl.[7] .............................. G06F 17/27; G06F 17/28
[52] U.S. Cl. ................................. 704/8; 707/536
[58] Field of Search ................................. 704/1, 2, 7, 8, 704/9, 10; 707/536, 540; 395/200.3, 200.33, 200.34, 200.35, 200.36, 200.37, 683; 709/200, 203, 204, 205, 206, 207

[56] References Cited

U.S. PATENT DOCUMENTS

| | | | |
|---|---|---|---|
| 4,566,078 | 1/1986 | Crabtree | 704/8 |
| 4,615,002 | 9/1986 | Innes | 704/8 |
| 5,287,444 | 2/1994 | Enescu et al. | 707/507 |
| 5,307,265 | 4/1994 | Winans | 704/8 |
| 5,583,761 | 12/1996 | Chou | 707/536 |
| 5,751,957 | 5/1998 | Hiroya et al. | 395/200.33 |

OTHER PUBLICATIONS

William S. Hall; "Adapt Your Program for Worldwide Use With Windows Internationalization Support"; Microsoft Sys. Journ., pp. 29–45, Dec. 1991.

catopen man page, Section 3C, HP–UX Release 10.0: Jun. 1995, pp. 3–34 through 3–35.

catgets man page, Section 3C, HP–UX Release 10.0: Jun. 1995, p. 3–33.

gencat man page, Section 1, HP–UX Release 10.0: Jun. 1995, pp. 1–247 through 1–248.

findmsg man page, Section 1, HP–UX Release 10.0: Jun. 1995, p. 1–229.

insertmsg man page, Section 1, HP–UX Release 10.0: Jun. 1995, pp. 1–285 through 1–286.

catgetmsg man page, Section 3, ULTRIX Man Pages, as publicly available from the Internet at: http://www.waterloo.ca/man/ultrix/catgetmsg.3int.html.

*Primary Examiner*—Joseph Thomas

[57] ABSTRACT

Methods and structure for storing log messages in a tokenized, international format and for presenting (viewing, printing, etc) the tokenized log message in a locally preferred native language. Log messages from a computing system or application are stored in an international tokenized format which remains constant regardless of the particular nation in which the system or application is operated. The tokenized format includes a message ID field which identifies a unique message and includes parameters values which are to replace variable portions, if any, of the identified message. A plurality of localized message catalog files are available to retrieve a localized native language string which corresponds to each tokenized message. The message ID field serves as an index to the localized catalog files. A viewer program then retrieves a localized text string message from a selected message catalog file replacing any variable portions identified therein with parameter values supplied in the tokenized message. The formatted, localized native language message is then presented (e.g., displayed, printed, etc.) to the requesting user in their preferred local native language. The present invention thereby enables users having a first preferred language to review or otherwise process logged messages generated by a system or application operable in an environment having a second preferred language. The present invention also simplifies parsing problems relating to automated analysis and post-processing of logged messages. The tokenized international format of the present invention remains constant regardless of the preferred local language of the system or application which generated the message.

27 Claims, 9 Drawing Sheets

```
267 *
BEGIN %s %s (pid=%P) (jobid=%s)
68 %s を開始しました。*\n(ユーザー: *"%s*", pid=%P)
24 ソース:                      %s:%s
25 ターゲット:                  %s:%s
33 実行フェーズのサマリ:
61    %s 構成しました            %s%s
65    %s スキップしました (解析時に)*\n%s%s
347 *
%2$ld 個のファイルセットのうちの %1$ld 個がスキップされました。
348 *
%2$ld 個のファイルセットのうちの %1$ld 個に対してエラー、警告は*\n
発生しませんでした。
```

*FIG. 7*

```
======  1997年03月11日 16時37分48秒 MST   BEGIN install AGENT SESSION
        (pid=1237) (jobid=swposix-0312)

* Agent session を開始しました。
  (ユーザー: "root@swposix.fc.hp.com", pid=1237)
* ソース:                              swi18n.fc.hp.com:/var/spool/sw
* ターゲット:                          swposix:/
* 実行フェーズのサマリ:
     構成しました                      test_token.ok_filest,r=
     スキップしました (解析時)         swposix(こ)
  test_token.skip_filest,r=
* 2個のファイルセットのうちの1個がスキップされました。
* 2個のファイルセットのうちの1個に対してエラー、警告は
  発生しませんでした。
```

FIG. 8

METHOD AND STRUCTURE FOR TOKENIZED MESSAGE LOGGING SYSTEM

BACKGROUND OF THE INVENTION

1. Field of the Invention

The present invention relates to computing systems and application which generate log files and in particular to methods and structures for generating a parameterized, tokenized log file to ease multi-national language translation problems in multi-national computing environments.

2. Discussion of Related Art

Application of computing systems is growing rapidly and internationally. A single computing system or application, for example, may now need to concern itself with communicating to users in a plurality of languages. Or, for example, large networks of computing systems and associated distributed applications are commonly deployed internationally. Multi-national corporate or other entities may therefore require information generated in one locale of the distributed computing environment, using a first native language (e.g., English), to be understood by another user in a second locale using a second native language (e.g., French).

One common computing application which exemplifies such a multi-lingual requirement is the generation and viewing of log information within such computing systems and applications. It is common for example that an operating system maintains a variety of log files to allow a system manager to track certain activities, configurations, and performance. In like manner, application programs operable atop such operating systems may maintain their own log files to enable monitoring of that application's operations. Users of these log files may be geographically separated and linguistically diverse. For example, support engineers and technicians may review such log files to determine potential causes of computing problems related to the system or application. However, a specialist support technician (for example a regional or international expert in support of a particular system or application) may speak a different native language than the native language in which the log files are generated.

An undesirable solution to this multi-lingual computing problem is to simply adopt one language as a standard (e.g., English) and force users to manually (mentally) translate from the standard language to their preferred native language. For obvious reasons, this option is impractical.

Therefore, in a multi-lingual computing environment, designers and vendors of such operating systems and application programs need concern themselves with features which automate the translation of messages (including log messages) in to a local native language. This process is also referred to herein as "localization" of the system or program.

One approach to localization is to select a preferred local (native) language for the system or program at the time the system is installed and configured. The program designers therefore design their systems and applications such that messages generated thereby are adapted to the local native language at the time of installation. For example, a program or system installed and configured in Japan will be configured to generate messages (e.g., messages in log files) in Japanese while the same program installed in China will be configured to log messages in Chinese. In such systems, there may exist a plurality of message catalogs, one for each language. However, one such language is selected for configuration (localization) of each system. Log files are therefore written and viewed (or otherwise utilized) in the locally preferred native language of the system which generated the log messages. Specifically, a system or application generates a log message by looking up a desired message in the selected local catalog using a message index value. The system or application then writes the log message found in the catalog into the log file. Messages in the log file are therefore written in the locally preferred native language and are viewed or otherwise utilized in that local language.

However, if systems in a distributed computing environment select different localized configurations of the system or program, other nodes in the distributed environment will be unable to view the remote systems' log files. For example, an attempt by a user to view a log file from a system localized for Japanese on a system localized for Chinese will likely result in garbage information being displayed. The Japanese encoding of log messages does not correspond to the Chinese viewing capability of the local system.

A different aspect to program and system localization has been to utilize a large character code set (e.g., ISO 10646 Unicode) which includes characters for several local languages. Each local language is encoded as a subset of characters in such an extended character set. A local viewer of a remotely generated log file therefore has knowledge of which local language the log message was written in. This solution does not help the user perform the needed translation but rather serves merely to help the local user identify the translation required for the message. For example, a user of a Japanese localized system viewing a log message from a Chinese localized system will recognize that the log message is encoded from the Chinese subset of the internationally extended character set. With an appropriate viewer program, the Japanese user may view the remotely generated log message in its native language (e.g., Chinese) rather than viewing the remote message as garbage characters on the Japanese localized system. However, this approach does nothing to translate the remotely logged message into the preferred local native language (e.g., Japanese). The user is still required to manually translate the remotely logged message.

It is clear from the above discussion that it remains a problem to permit local review of remotely generated log messages in a locally preferred native language regardless of the remotely preferred native language.

SUMMARY OF THE INVENTION

The present invention solves the above and other problems, thereby advancing the state of the useful arts, by providing methods and structures for generating and viewing log messages using an international tokenized log message format. This tokenized format is locally viewed by use of a viewer program in the preferred local native language. In particular, tokenized log messages generated in accordance with the present invention include a message ID value along with parameter values and control values used to add variable information to the message identified by the message ID. The tokenized message so generated is written to the system or application log file. The messages in the log file therefore are international by nature in that they contain little or no information which is unique to the specific local native language. Rather, the entire message is encoded by the message ID in combination with any specified parameter values.

The message ID value serves as an index into a local message catalog file. Each message in the local message catalog file is encoded in the locally preferred native language of the local system. Variable portions of the message are encoded so as to identify (positionally) which of the parameter values of the logged message are to be used when viewing the logged message. A viewer program therefore operates on the local system at which a user wishes to view the logged message. The message viewer program retrieves a tokenized log message (e.g., from a locally or remotely generated log file) and presents it to the user in the user's locally preferred native language. First the message ID of the tokenized log message is used to locate and retrieve a corresponding message (a message encoded in the locally preferred native language) in a selected message catalog. Next, any variable portions encoded in the retrieved local message are replaced by a corresponding parameter value supplied in the tokenized log message. The correspondence of variables and parameter values is preferably positional so that positional difference among local languages may be represented in the local message catalogs. Finally, the tokenized message translated to the selected native language is presented to the user (e.g., displayed, printed or filed as desired for the particular viewer program).

The present invention therefore solves problems of prior approaches by writing (generating) log messages and storing them in an international format. Each user wishing to view (or otherwise utilize) the international, tokenized log messages may do so with a viewer program using a localized native language message catalog for the translation process. For example, a tokenized log message file generated by a system or application localized for Chinese language operation may be viewed (or otherwise utilized) on another system localized for other than Chinese local language operation (e.g., English, Japanese, etc.). For example, a Japanese support engineer may thereby review, in Japanese, a log file generated by a customer's system or application localized for French language operation.

Standard C programming language library functions such as catopen(), catclose(), catgets(), and catgetmsg() are exemplary of well known API functions which may be useful in implementing a viewer program in accordance with the methods of the present invention. A localized message catalog may be accessed by such API functions to retrieve the template used to display (or otherwise present to a user) a tokenized message in the preferred local language and style. The catalog template entries may, for example, comprise C language sprintf() format strings used by the viewer program to format any supplied parameters and to generate an output string from the format (catalog template entry).

An additional benefit realized by the present invention is that the tokenized log message format may be more easily parsed by computer programs wishing to analyze or otherwise process the logged information. Automated parsing of logged information in accordance with prior techniques required the parsing program to be aware of linguistic aspects of the log file (i.e., the language the log file was generated in). Locating the position of a particular parameter value in a message logged in accordance with prior techniques required the parser to be aware of the language in which the message was generated due to sentence structure, vocabulary, and character set differences among several languages. Tokenized log messages in accordance with the present invention may be parsed independent of the local native language of the computing system. The message itself and associated parameter values are easily located in the tokenized log message regardless of the local native language of the generating computer system. The tokenized message format of the present invention is constant regardless of the preferred local language of the computer on which the message was generated and regardless of the preferred local language of the system on which the parsing is performed.

Additional advantages of the invention will be set forth in part in the description which follows, and in part will be obvious from the description, or may be learned by practice of the invention. The advantages of the invention may be realized and attained by means of instrumentalities and combinations particularly pointed out in the appended claims.

BRIEF DESCRIPTION OF THE DRAWINGS

FIG. 7 is a graphical presentation of Japanese text of exemplary entries in a Japanese message catalog;

FIG. 8 is a graphical presentation of Japanese text of an exemplary presentation of a tokenized log message file presented in accordance with the exemplary catalog entries of FIG. 7.

DESCRIPTION OF THE PREFERRED EMBODIMENT

Figure 1:
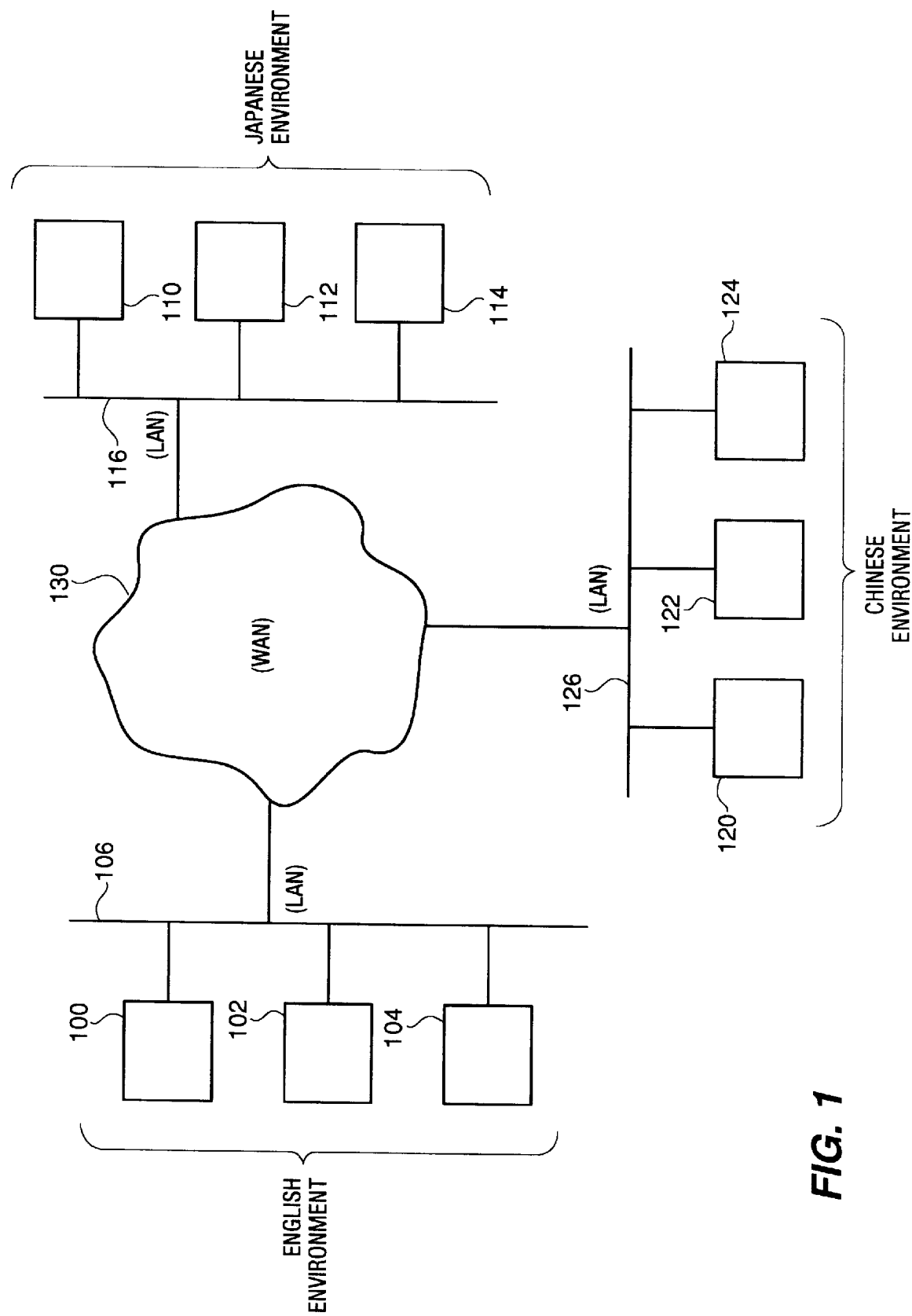
FIG. 1 is a block diagram of a distributed computing environment in which the methods and structures of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

TOKENIZED MESSAGE APPLICATION

FIG. 1 is a block diagram of an exemplary multi-lingual distributed computing environment in which the methods and structures of the present invention may be advantageously applied. Systems 100, 102, and 104 are interconnected via local area network (LAN) 106. These systems may represent, for example, a single workgroup or location of a multi-lingual computing enterprise. These systems 100–104 share a first local native language (e.g., English). A second workgroup of systems 110–114 are interconnected via LAN 116 and share a second local native language (e.g., Japanese). Still a third workgroup of systems, 120–124, are interconnected via LAN 126 and share a third native language (e.g., Chinese). All systems are interconnected via wide area network (WAN) 130.

Systems in each workgroup are typically configured to operate in their respective local native language. As noted above with respect to prior techniques, prior logging methods logged information in the locally configured native language. However, it may be desirable for a user (e.g., support engineer, analyst, or manager) to view on his/her local system a log file generated from another system. In accordance with prior techniques, so long as the two systems (the viewing system and the log generating system) are configured for the same local native language, there are few if any problems encountered. Standard file sharing or networking techniques are used to retrieve a log file from another system and the log file is simply viewed on the user's system in the same language in which it was generated. However, as noted above, where in accordance with prior techniques the log file is generated in a different native language than that of the viewing system, unexpected results may be obtained.

In accordance with the methods and structures of the present invention, a tokenized log file generated by any system in the enterprise may be viewed in any selected language (including the local native language of any system in the enterprise). For example, a tokenized log file generated on an English configured system 100 may be viewed in English by a viewer program on any of systems 100–104, in Japanese by a viewer program on any of systems 110–114, or in Chinese by a viewer program on any of systems 120–124. The tokenized log message format of he present invention is therefore also referred to herein as language independent. The translation of the tokenized (language independent) format to a local native language by a viewer program generates a local native language or language dependent presentation of the tokenized log messages.

Figure 2:
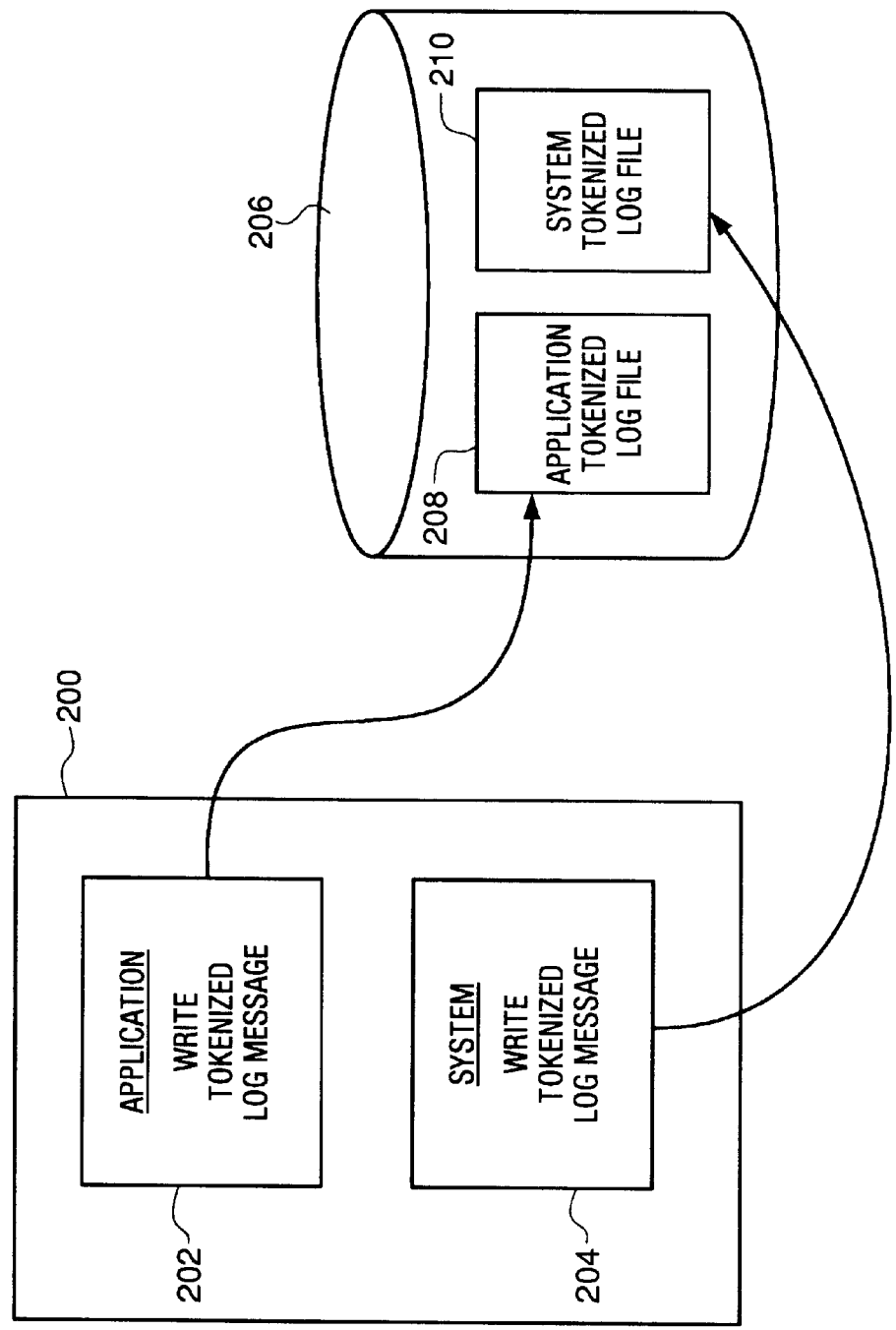
FIG. 2 is a block diagram of a computing process operable in accordance with the present invention to generate a tokenized message log file.

FIG. 2 is a block diagram of a system 200 in which an application process 202 writes a tokenized application log file 208 on a storage device 206. In addition, a system process 204 writes a system tokenized log file 210 on storage device 206. One skilled in the art will recognize that the techniques of generating log files may be performed by a plurality of processes within a system. Each process may generate one or more such tokenized log files either by direct operations to write tokenized log messages to a log file or via centralized services provided within a system environment. A plurality of log files may be used to distinguish certain classes of log messages such as system/application, errors/ information/warning, etc. In the alternative, a single, centralized, log service may generate a single log file wherein the log entries include tokenized information representing the class or type of log message.

Figure 3:
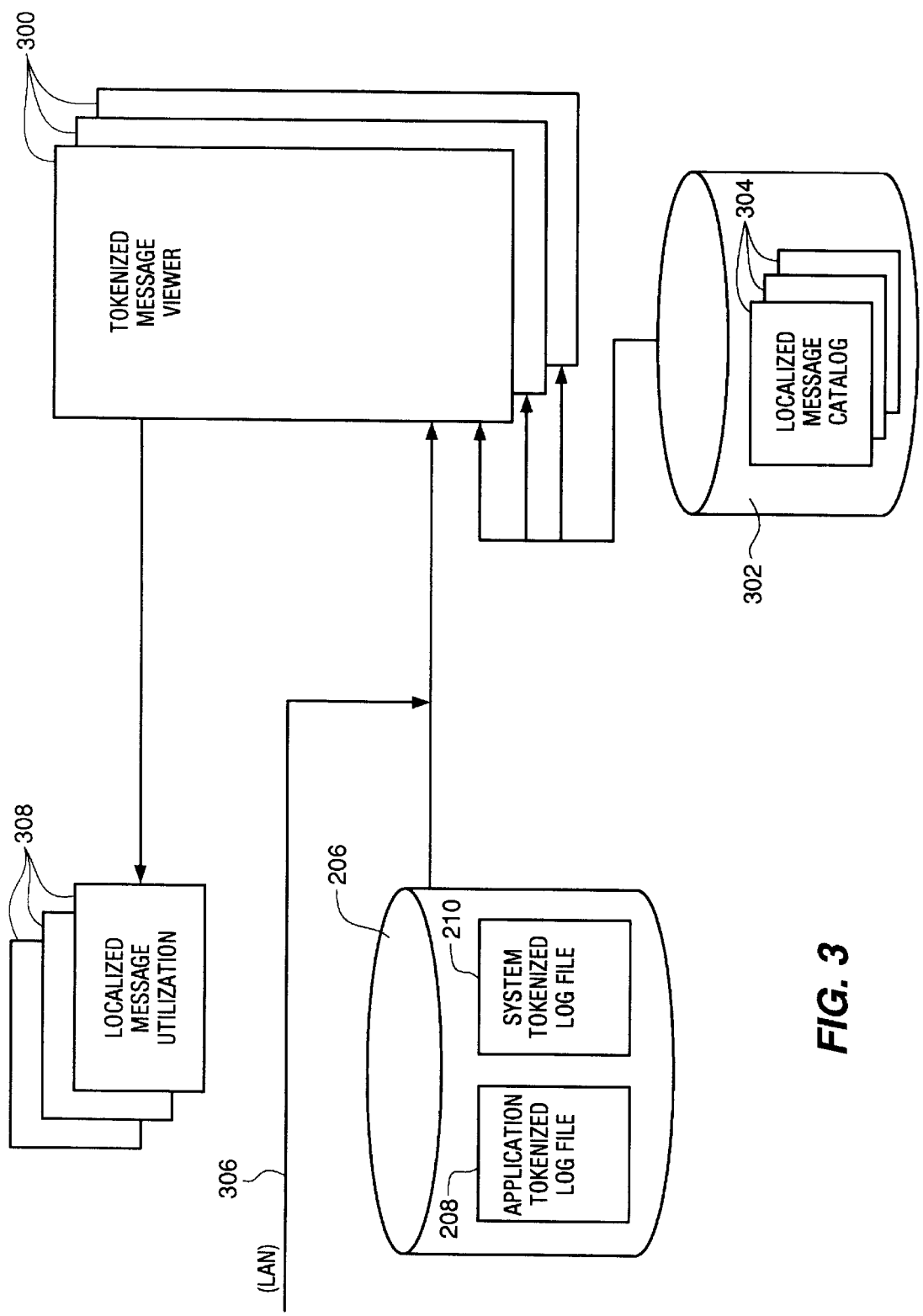
FIG. 3 is a block diagram of a computing process operable in accordance with the present invention to retrieve tokenized log messages and to present the message in localized format.

FIG. 3 is a block diagram of a system 300 used to view (also referred to herein as present) a previously generated tokenized log file. A viewer process in system 300 receives a previously generated log file from storage device 206 (e.g., application tokenized log file 208 or system tokenized log file 210). Alternatively, a tokenized log file may be retrieved from a remote system via LAN 306. The viewer program is configured to view tokenized log files in a selected local native language. A plurality of localized message catalogs 304 are available to the system 300 on storage medium 302 (e.g., one for each possible local native language). As above, the source of the message catalog files may be any local storage device or remotely attached storage via well known network connections and protocols. The viewer process in system 300 then translates and transforms the language independent format of the tokenized log messages into localized messages for presentation to (viewing by) the user. The presentation of such localized log messages may be by display on a computer screen, printing, generated speech, or other well known user interface techniques.

TOKENIZED MESSAGE GENERATION AND PRESENTATION METHODS

Figure 4:
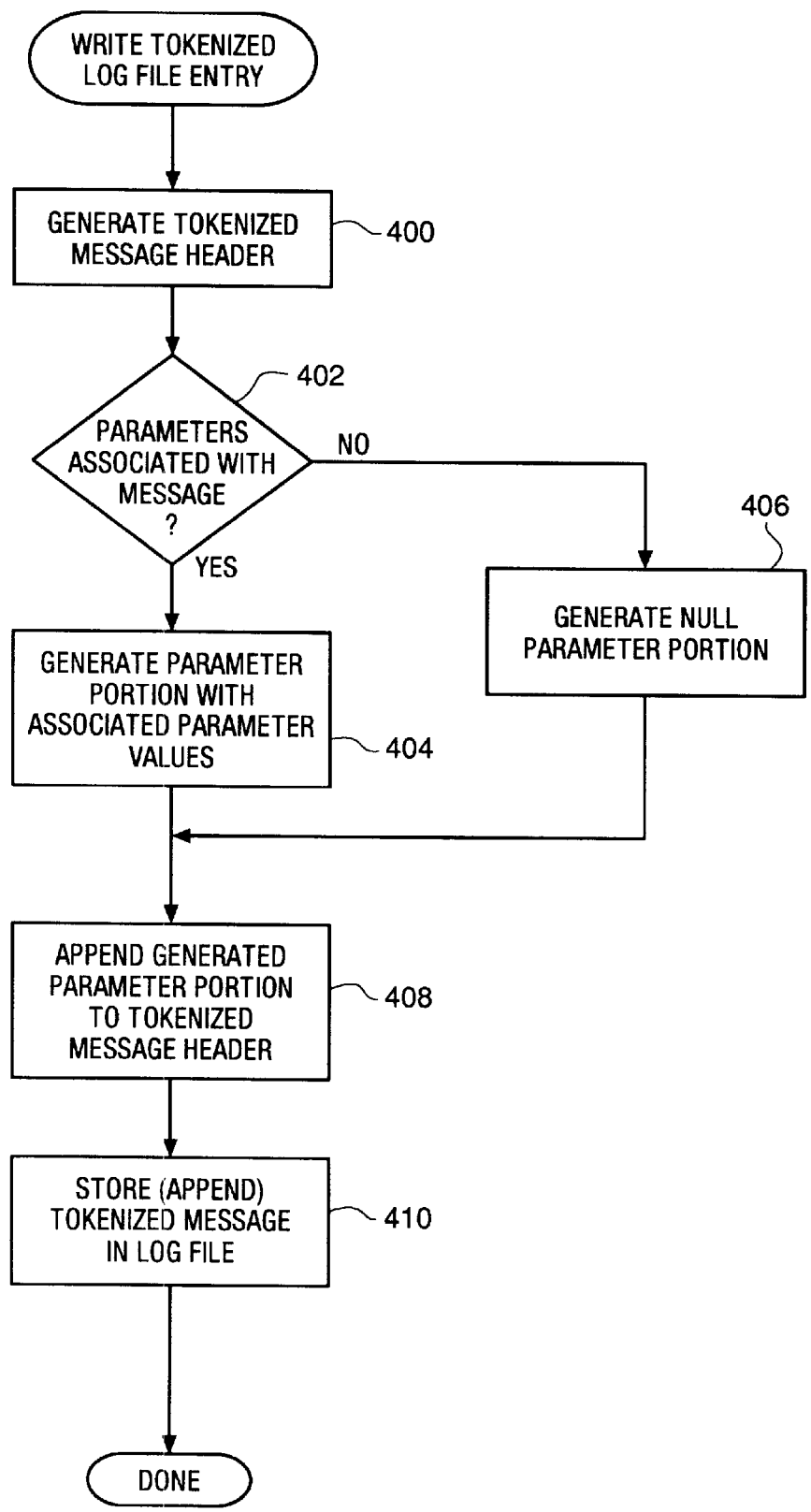
FIG. 4 is a flowchart describing the operation of a method of the present invention to generate and store a tokenized log message as shown in FIG. 2.

FIG. 4 is a flowchart describing the operation of methods of the present invention to generate tokenized log messages in a tokenized log file. The method of FIG. 4 is operable in a system such as shown in FIG. 2 to generate tokenized log files. One skilled in the art will recognize that the method of FIG. 4 is operable at many levels including application programs as well as operating system processes. Similarly, it will be recognized that the method of FIG. 4 is operable to store the generated messages in a log file as well as other storage devices and formats. Further, the generated messages may be transferred via networks to a remote process for concurrent viewing in the preferred local native language of the remote site. In like manner, the method of FIG. 4 may send the tokenized messages to communication media for transmission to other processes for further manipulation, storage, or viewing. Well known interprocess communication between processes operable on the same computer or on distinct computers may be applied for such message communications.

Element 400 of FIG. 4 is first operable to generate a header portion of the tokenized log message (also referred to herein as a token header). As discussed below, the header portion includes a message ID field which identifies the particular message being generated in a language independent manner. The message ID field is preferably a structured field including a number of subcomponents to identify a particular catalog, a particular subset within the catalog, and a particular message within the subset. Such hierarchical definition of a message ID allows improved flexibility in the maintenance of the message catalogs. Other fields may be included in the header portion as discussed below to permit other parsing and analysis of the messages in the message log.

Some messages are static in nature while others are dynamic in that the message needs to be customized to indicate a specific value or state. Such dynamic messages are encoded with variable portions to be replaced by particular values when viewed by a user. For example, a status message may indicate the current utilization level of a resource. The tokenized message therefore includes the present value of the resource utilization. Such values are referred to herein as parameter values or token values.

Element 402 is next operable to determine if any parameter values (token values are required for the particular message being generated. The parameter values (token values), if any, are appended to the tokenized message under construction. If the message has no variable portions, no dynamic features, no parameter values are required. If element 402 determines that parameter values are required for the message being generated, element 404 is operable to generate the requisite parameter values as a parameter portion to be appended to the tokenized message. Otherwise, element 406 is operable to generate a null parameter portion to be appended to the tokenized message under construction.

In both cases, element 408 is next operable to append the generated parameter portion to the tokenized message under construction. Preferably, the parameter portion is appended to the message after the token header with a delimiter character separating the two portions. In the case of a null parameter portion, the delimiter character will be followed by no parameter values.

Lastly, element 410 is operable to write the tokenized message comprising the token header and parameter portion to a log file for persistent storage. As noted above, the tokenized log message may be written to any of several well known storage media either locally or remotely accessed. In the alternative, the tokenized log message may be written directly to other processes (either local or remote) for further processing using well known interprocess communication techniques.

Figure 5:
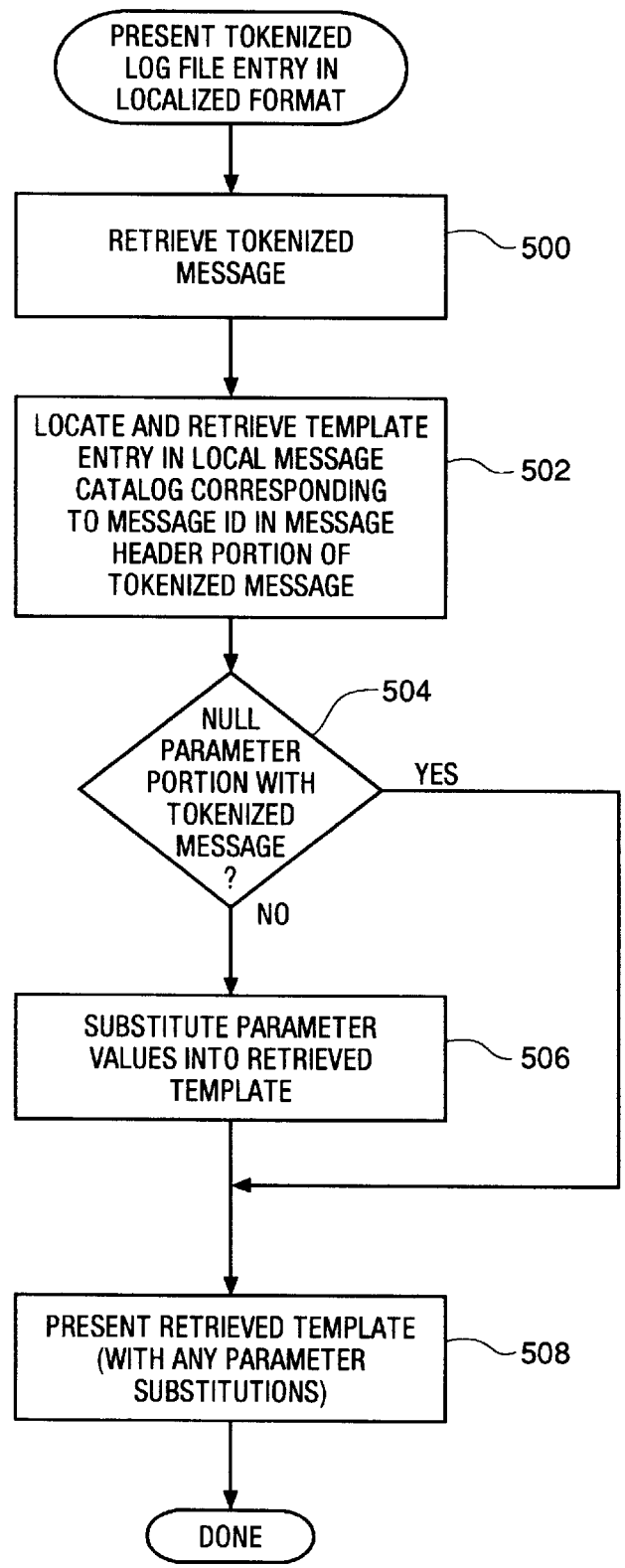
FIG. 5 is a flowchart describing the operation of a method of the present invention to retrieve a previously generated tokenized log message and present the message in localized form as shown in FIG. 3.

FIG. 5 is a flowchart describing the method of the present invention to present a tokenized log file entry (a tokenized message) in localized, native language format. The method of FIG. 5 is operable in a system such as shown in FIG. 3 to present tokenized messages retrieved from log files (either local or remote). It will be recognized by those skilled in the art that the method of FIG. 5 is operable to retrieve the generated messages from a log file (local or remote) as well as other storage devices. In like manner, the method of FIG. 5 may receive the tokenized messages from communication media on which other processes (local or remote) have transmitted the tokenized log messages. Well known interprocess communication between processes operable on the same computer or on distinct computers may be applied for such message communications.

Element 500 of FIG. 5 is therefore operable to receive a tokenized message for presentation (viewing). As noted herein, the message may be retrieved from storage devices (either local or remote) or may be received directly from a generating process via a communication medium and well known inter-process communication techniques. Element 502 is next operable to locate and retrieve an entry in the selected local message catalog having a message ID corresponding to the message ID in the header portion (token header) of the tokenized message received (or retrieved) by operation of element 500. As noted above, the local system on which the method of FIG. 5 may be configured to operate in any of several locally preferred native languages. This configuration operates to select among a plurality of possible message catalogs. Other portions of the header portion (token header) may be used to further refine the selection of a particular message catalog file. For example, there may be separate catalogs identified by fields in the header portion for each of several application processes or for system processes. Further, particular subsets of particular catalogs may be identified by fields in the header portion of the tokenized message. Well known techniques for file naming and file indexing may be applied by operation of element 502 to locate and retrieve the message catalog entry corresponding to the received tokenized message.

The entry retrieved from the catalog is also referred to herein as a template in that it provides a template for presentation of the tokenized message in the preferred local native language. The template is therefore preferably copied to a working buffer for purposes of generating the intended localized message from the retrieved template. If the content of the message as presented in the native language is static, then the template retrieved from the selected catalog and copied to a working buffer is the entire message to be presented. If the message has dynamic aspects, then as noted above, parameter values in the parameter portion (token values) of the tokenized message will be substituted for designated variable portions of the template to generate the intended localized message for presentation. Element 504 is therefore operable to determine whether the template contains any variable portions to be replaced by parameter values (token values) from the parameter portion of the tokenized message. If such variable portions are present in the template, then element 506 is operable to substitute corresponding parameter values from the parameter portion of the tokenized message into the buffered copy of the template in place of variable portions.

Finally, element 508 is operable to present the tokenized message as completely converted to localized native language format. Any variable portions in the message have been replaced by corresponding parameter values and the message is now presentable to a user in the local native language. Presentation of the message may include, for example, printing the message, displaying the message on a display screen, generating voice audio data corresponding to the message, as well as other well known user interface methods for the presentation of information.

The methods of FIGS. 4 and 5 are presented as though a single message is generated and presented. Those skilled in the art will recognize that repeated application of such methods will generate and present a plurality of such log messages.

Figure 6:
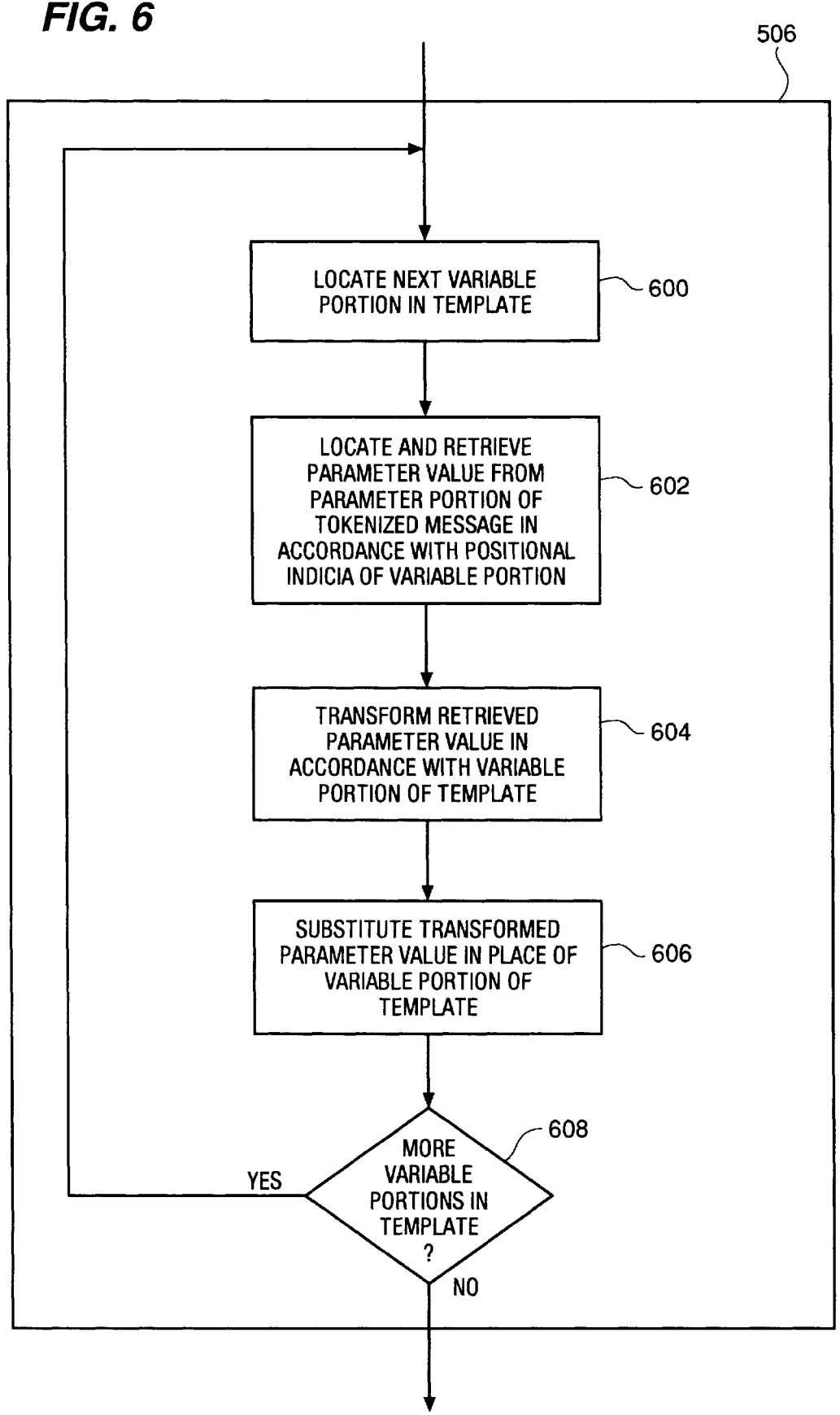
FIG. 6 is a flowchart describing the operation of the parameter substitution processing performed as a step in the method of FIG. 5.

FIG. 6 is a flowchart describing the operation of element 506 of FIG. 5 in additional detail. Element 506 is operable to substitute token values (parameter values) from the parameter portion of the tokenized message into corresponding variable portions of the template used to construct the localized native language message. As noted, log messages may include dynamic portions which are replaced at time of generation with actual values appropriate to the message and generating system. Templates in the local message catalog files therefore include an encoding of variable portions associated with a template.

In a simple embodiment, each variable portion in a template from start to end is replaced by a corresponding parameter value in sequential order as they are provided in the parameter portion. In other words, the first variable portion in a template is replaced by the first parameter value in the parameter portion, the second by the second, etc. However, different native languages often require alteration of the order of words or phrases in a particular sentence structure. A strict replacement of each variable portion in a template, in sequence, by the corresponding parameter value, in sequence does not allow for such order differences among native languages when a tokenized message is presented. In the preferred embodiment of the present invention, the variable portions of the template therefore include positional indicia indicative of which of the parameter values is to be used in the substitution.

For example, in first native language, a message may be structured as (where variable portion substitutions are indicated in bold italics and wherein the text would be presented in appropriate text for that language):

There are presently *10* processes running using *100 MB* of virtual memory. Whereas in a second language, the same tokenized message may be phrased as:

There are *100 MB* of virtual memory in use by *10* running processes. Strict sequential substitution of parameter values for the variable portions cannot handle such linguistic differences. The preferred embodiment would therefore allow the first template to specify a different order of parameter substitution than the second template. Such template encoding may be implemented by well known features of the C programming language. So-called format specifications in the sprintf() function calls permits the specification to determine which parameter is to be used in the substitution. Specifically, a standard format specification is used as noted above by applying to the next argument (parameter value) in sequence as supplied to the sprintf() function call. However, The printf() family of functions supports random access to arguments. Conversions can be applied to the nth argument in the argument list, rather than to the next unused argument. In this case, the conversion character (%) is replaced by the sequence %digit$, where digit is a decimal integer n in the range [1,{NL_ARGMA}], giving the position of the argument in the argument list. This feature provides for the definition of format strings that select arguments in an order other than standard sequential order as provided in the sprintf() function call.

Therefore, in the preferred embodiment, message catalog template entries include (among other fields) a C programming language format specification field which describes the local native language message corresponding to a particular message ID. The format specification includes conversion fields for any variable portions of the message to define the format of the parameter value (e.g., numeric, character string, floating point, date, time, etc.) to be substituted for the variable portion of the template. The conversion fields use the random access format specification features described above to select the order of the parameter value substitution as required by the local native language.

FIG. 6 therefore describes the operation of element 506 to substitute parameter values for the variable portions of the template corresponding to the tokenized message ID. Element 600 is first operable to locate a next variable portion in the template copy. Element 602 then locates and retrieves the parameter value from the parameter portion of the tokenized message in accordance with the random access sequence value of the sprintf() conversion field defining the variable portion of the template. Element 604 then transforms the retrieved parameter value in accordance with the conversion specification defining the variable portion of the template. Element 606 replaces the variable portion of the template (the conversion field) with the parameter value as transformed by operation of element 604. Lastly, element 608 determines whether additional variable portions remain in the template. If more variable portions remain in the template, processing loops back to element 600 until all variable portions of the template (conversion fields) have been processed. In essence, element 506 may be implemented as a standard sprintf() function invocation. However, those skilled in the art will recognize other equivalent implementations which may be better suited to particular environments. Element 506 may therefore be implemented by any of several well known formatting techniques including standard C programming language library function calls. In particular, the preferred embodiment permits conversion specification which encode special parameters as described below. Such special conversion specifications are outside the scope of the C programming language standard library function call. It is therefore preferred in the best presently known mode of practicing the invention to utilize a customized conversion library function modeled substantially in accordance with the C language sprintf() library function.

SPECIAL PARAMETERS

As noted above, the conversion specifications permitted by the present include format conversion specification which define special parameters useful in encoding complex messages in multiple native languages. For example, the date and/or time at which a message was generated as indicated by the message header portion time stamp value may be presented by to a user by a viewer program. Or for example, a process ID of the process that generated the messages (as distinct from the viewer process which is presenting the tokenized message to the user) may be useful for presentation in a message. Special parameters features of the present invention provide a means to enter data into the parameter list of a tokenized message without requiring the programmer of the application generating the tokenized message to obtain and explicitly enter the value of that parameter. In addition, such special parameters may be automatically formatted in the locally preferred native style (e.g., date and time formats specific to a local language).

Standard C language style format specifications do not include a format conversion specification which would have special knowledge of such encoded parameters. It is therefore useful to have special format specifications available in encoding the template entry of the catalog which specifies that such special parameters be presented in the format preferred by the local native language. In general, format specifications customized to such special presentation needs of local native languages are encoded as special format specifications in the template string.

Special parameter values precede all other parameter values in the parameter portion of the tokenized message. As noted above, a value in the header portion of the tokenized message identifies the number of such special parameter values which are stored at the start of the parameter portion of the tokenized message.

A format specification of "%D" is used, for example, to indicate that the date (e.g., the time stamp date in the header portion) be displayed or printed in the format preferred by the local native language. Likewise, a "%T" format specification could be used to present a time value (e.g., the time stamp value in the header portion of the message) in a locally preferred format. Other special parameter types might include: a format specification of a process ID value (e.g., "%P"), a format specification for the last system error number (e.g., "%m"), the name of the process which generated the log file entry, the total memory used by a particular process, etc. Those skilled in the art will recognize a variety of such format conversion specification types for formatted presentation of equivalent special parameters. Such special format conversions are extensions and enhancements to the standard conversions commonly available in the C programming language.

MESSAGE NESTING SPECIAL PARAMETERS

Another type of special parameter encoding enables the nesting of messages within a message template. As noted above, each message is associated with a message ID value used as an index to locate the corresponding template in the selected catalog. A nested message is one which is used to complete the presentation of another message. In other words, a first template in a message catalog may include a special parameter the value of which is a message ID value which identifies another (a second) template to be inserted (nested) at that point in presentation of the first message template.

As a simple nested message example, consider the two sentences:

"The man opened the window."
"The man opened the door."

Using the format conversion specification "%Z" to indicate a nested message special parameter, a message template catalog might include the following templates:

| Message ID | Message template string |
|---|---|
| 12340 | "the door" |
| 12341 | "the window" |
| 12342 | "The man opened % Z." |

A tokenized log message might therefore include the following to represent the sentences:

"The man opened the door."
"The man opened the window."

| Message ID | Date and other header information | Parameter values |
|---|---|---|
| 12342 | ... | 12340 |
| 12342 | ... | 12341 |

In this simple example, the messages 12340 and 12341 are nested within message 12342. Multiple such embedded or nested messages may occur within a message and the nested message may itself include parameters (including special parameter values).

TOKENIZED MESSAGE DATA STRUCTURES, FORMATS, AND EXAMPLES

As noted above, a tokenized message comprises a header portion and a possible null parameter portion. The header portion identifies the message and the appropriate message catalog to be used in presenting it in localized form. One exemplary data structure which may be used to describe the header structure is as follows (in C-like pseudo-code):

```
struct tok_msg_hdr {
    boolean flags[NFLAGS],      /* flags used to classify and
                                   analyze messages */
    struct msg_ID {
        id_type msg_identifier, /* identifier value for message */
        set_type set_identifier,/* subset of catalog in which
                                   message is found */
        cat_type catalog_identifier /* catalog in which message
                                       is found */
    } ID,
    time_t time_satmp,          /* date/time of message
                                   generation */
    int s_parm_present          /* number of special parameters
                                   present */
}
```

Following the header portion of the tokenized message is the parameter portion where the parameter values (token values) are appended to the message. For example, character string values may be appended encoded between matched quotation marks, numeric values may be appended encoded in decimal digits, booleans may be encoded as decimal zeros or ones, etc. A variety of encoding techniques may be applied to the construction of the header portion and the parameter portion. The above pseudo-code data structure is therefore intended only to suggest the type of information which may be useful in conjunction with the methods of the present invention. Character encoding of the header portion may be preferred for ease of porting and human readability while binary encoding of various values may be preferred to reduce the size of tokenized log messages and log files.

As noted above, the message catalog entries (templates) are constructed to correspond to the message ID information encoded in tokenized message headers and map that ID to a sprintf() style format specification used to convert the tokenized message for localized presentation. As noted the format specification provides the text in local native language along with the conversion fields for any variable portions of the message. The conversion fields preferably utilize the random access feature to allow re-ordering of parameter values as required for a particular local native language sentence structure. As a pseudo-code data structure, a message catalog template entry may be encoded as follows:

```
struct tok_msg_hdr {
    struct msg_ID {
        id_type msg_identifier,  /* identifier value for message */
        set_type set_identifier, /* subset of catalog in which
                                    message is found */
    } ID,
    char template[] =            /* exemplary template with
                                    variable portions */
        "There are %2$d processes running using %1$d of
         memory\n",
}
```

The cat_identifier portion of the ID is subsumed in the identification of the catalog which contains the template and is therefore removed from the ID field within the catalog entry. Otherwise, the ID field of the template is used to match the ID field of the tokenized message to be presented. Any of several well known search techniques and associated structures may be employed to speed the search for the proper catalog to localize a tokenized message as well as to speed the search for a particular template within the catalog.

The localization of language independent tokenized messages may be seen in the following examples. A sample tokenized log file (set of log messages) may include the following where "!" is a delimiter character to delimit the header portion from the parameter portion and wherein the parameter portion (if any) appears indented on the line below the header portion for typographic clarity herein:

```
0    0    140267   14   267   858123468   1   !
     P1237 "install" "AGENT SESSION" "swposix-0312"
0    7    140068   14   68    858123468   1   !
     P1237 "Agent Session" "root@swposix.fc.hp.com"
0    7    140024   14   24    858123526   0   !
     "swi18n.fc.hp.com" "/var/spool/sw"
0    7    140025   14   25    858123526   0   !
     "swposix" "/"
0    7    140033   14   33    858123567   0   !
0    11   140061   14   61    858123567   0   !
     "" "" "test_token.ok_filest,r="
0    11   140065   14   65    858123567   0   !
     "" "" "test_token.skip_filest,r="
0    7    140347   14   347   858123567   0   !
     1 2
0    7    140348   14   348   858123567   0   !
     1 2
```

The first and second tokenized messages (message IDs 267 and 68) each include one special parameter hence the s_parm_present parameter of those messages is set to one indicating the number of special parameters present. Specifically, those messages have a process ID parameter as a first parameter value. As noted above, the values of special parameters precede all other parameter values in the parameter portion of the message. Special parameter values are placed ahead of positional parameters to simplify parsing of the message template and generation and presentation of messages therefrom. In particular, the first two messages have a process ID value of P1237 as the special parameter value. Positional parameter values follow the special parameter value.

An English language message catalog may include the following entries related to the above tokenized messages:

| | |
|---|---|
| 267 | "BEGIN %s %s (pid=%P) (jobid=%s)" |
| 68 | "%s started for user\"%s\". (pid=%P)" |
| 24 | "Source:     %s:%s" |
| 25 | "Target:     %s:%s" |
| 33 | "Summary of Execution Phase:" |
| 61 | "   %s Configured     %s%s" |
| 65 | "   %s Skipped (in analysis)     %s%s" |
| 347 | "%d of %d filesets were Skipped." |
| 348 | "%d of %d filesets had no Errors or Warnings." |

It will be noted that the first two of the above exemplary templates have a process ID special parameter format conversion specification embedded in the format string. Specifically, the "%P" element of those format strings is to be replaced by the special parameter process ID value from the tokenized message parameter portion. The purposes of this particular special parameter is, as noted above, to present the process ID of the process which generated the tokenized message entry (not otherwise readily available to the viewer/presentation program).

An equivalent message catalog for Japanese is depicted in FIG. 7. The Japanese exemplary catalog is displayed graphically in FIG. 7 due to limitations on printing of such Japanese symbols within this text body. Note that parameters in the templates for message ID 347 and 348 use positional designations to alter the English standard order of the parameters provided. The Yen symbol "¥" is used at the end of lines in FIG. 7 which are continued to the next line of the message template display (analogous to the English use of the backslash "\" character).

When presented on a system configured for English as the local native language and thereby selecting the proper message catalog including the above exemplary templates the above tokenized messages would be displayed or printed (presented) as follows:

| | |
|---|---|
| ======= | 03/11/97 16:37:48 MST BEGIN install AGENT SESSION (pid=1237) (jobid=swposix-0312) |
| * | Agent session started for user "root@swposix.fc.hp.com" (pid=1237) |
| * | Source:     swi18n.fc.hp.com:/var/spool/sw |
| * | Target:     swposix:/ |
| * | Summary of Execution Phase: Configured test_token.ok_filest,r= Skipped (in analysis) test_token.skip_filest,r= |
| * | 1 of 2 filesets were Skipped. |
| * | 1 of 2 filesets had no Errors or Warnings. |

Certain information presented in the above exemplary English language presentation may be automatically generated by the viewing system in accordance with local standards based upon information encoded in the message header portion. For example, the "=======" string and the date and time displayed on the first message are generated by the viewer system based upon the message ID and message type fields of the message header portion of the tokenized message. The equal signs may be preferred locally to signify the start of a set of related logged messages. The corresponding date and time may be generated from the time stamp value in the message header. The "*" symbol is likewise generated by the viewer program locally in response to the message ID and message type fields of the header portion of the corresponding tokenized message entries. Those skilled in the art will recognize many such custom formatting options based upon information stored in the header portion of a tokenized message. Start and end of related logged messages, dates and time thereof, etc. all may be encoded in the message header values and may be used to generate particular formatted output corresponding to the tokenized message.

An equivalent Japanese presentation of the same tokenized log file messages is depicted in FIG. 8. The Japanese presentation is displayed graphically in FIG. 8 due to limitations on printing of such Japanese symbols within this text body. Note that positional parameters have been reversed relative to the English presentation for messages presented in accordance with templates for message IDs 347 and 348.

GENERATION OF TOKENIZED MESSAGES

In the simplest case, the tokenized messages may be generated by any of several standard programming techniques to simply write message header portion and parameter portion with the requisite values. As noted above, the values may be written as binary data or encoded as character data (e.g., ASCII encoded). The token values are localized as described above into appropriate formats for presentation in the locally preferred native language. However, in the preferred embodiment, a more rigorous method of generating the tokenized messages enables type checking and/or type conversion features in the generation of tokenized messages.

In the preferred embodiment, a function is invoked with parameters including the message ID of the message to be generated followed by a variable length (possibly null) list of parameter values to be substituted into the message template corresponding to the message ID. The message ID and parameter values are written to the tokenized message as noted above, However, before doing so, the methods of the preferred embodiment of the present invention retrieve the corresponding template from a canonical message catalog for purposes of generating any required special parameter values and for purposes of checking and/or converting the types of the variable length list of supplied parameters values.

Figure 9:
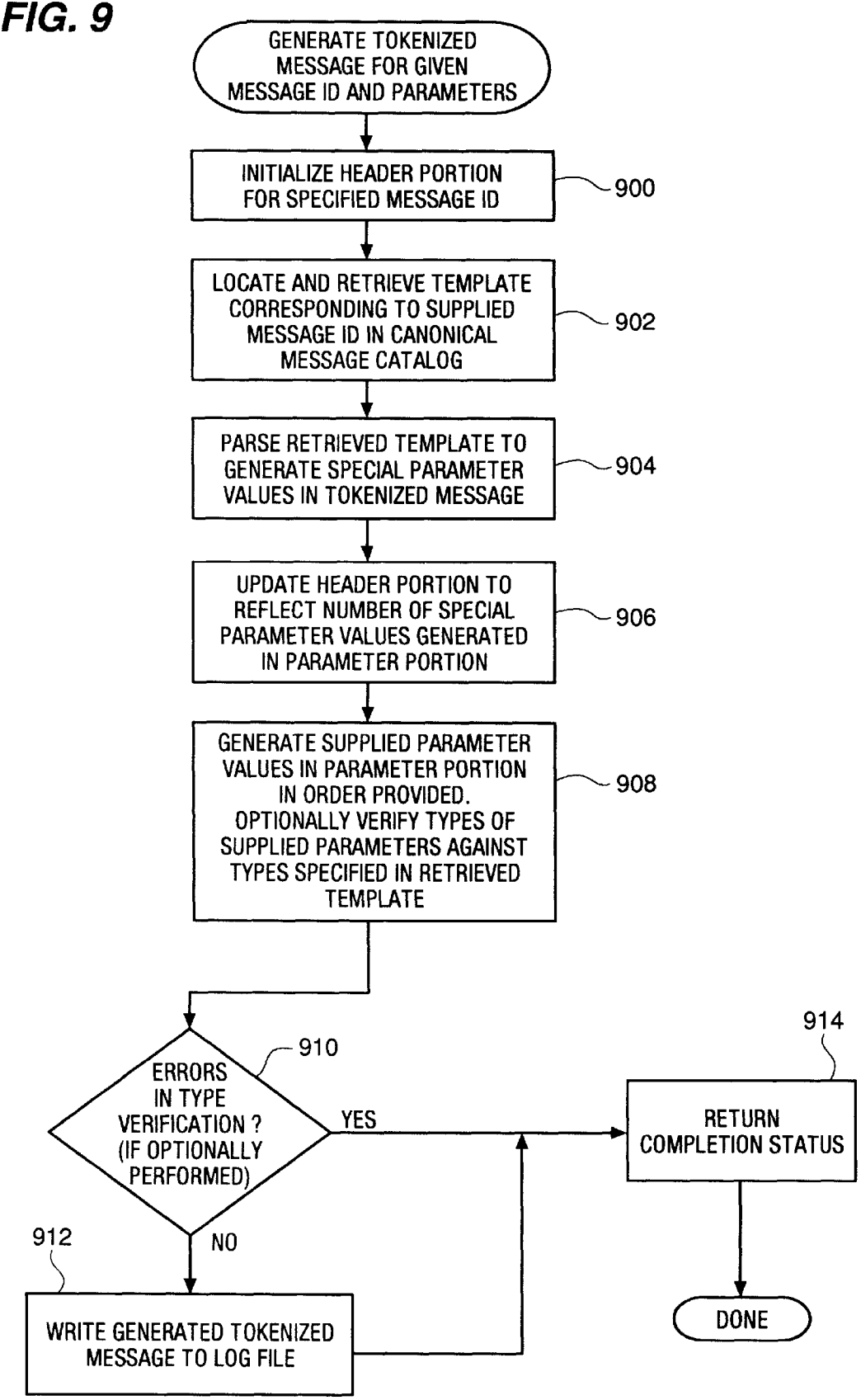
FIG. 9 is a flowchart describing the operations of a method of the present invention to generate a tokenized message using templates in a canonical message catalog.

FIG. 9 describes a preferred method of the present invention for generation of a tokenized message using templates in a canonical message catalog. The canonical message catalog is preferably the message catalog encoded in the language of the system or application designers. These message template are originally created to express a particular concept required by the system or application in the native language of the program designer. Once such an application or system is designed and operational, all such message template are translated into other required languages for support of multi-national deployment of the system or application.

Element 900 of FIG. 9 is first operable to initialize the header portion of the message to be generated. The header portion is initialized in a buffer used to construct the tokenized message requested. The structure of the header portion is as discussed above. Element 902 is next operable to locate and retrieve the message catalog entry corresponding tot he supplied message ID. The template of the retrieved entry is then parsed by element 904 to locate any special parameter format conversion specifications (as described above) and to generate appropriate special parameter values (if any) in the parameter portion of the tokenized message buffer under construction. For each special parameter conversion specification so located, the requisite parameter value is retrieved (or generated) and written to the parameter portion of the tokenized message being generated. If multiple special parameter format conversion specifications are so located, each parameter value (if required) is written to the parameter portion of the message in the order in which they are encountered.

Element 906 then updates the header portion of the tokenized message under construction to reflect the actual number of special parameter values present in the parameter portion of the message. Element 908 then appends the supplied parameter values (the positional parameters) to the end of the parameter portion of the tokenized message being constructed. The supplied values are written to the parameter portion in the order in which they are supplied to the function. Element 908 may also verify the types of the supplied parameter against the types identified in the template format specification corresponding to the positional parameters. The type of each supplied parameter is also supplied to the function or is otherwise determined in accordance with the standards of the programming language implementing the message generation function.

Element 910 is then operable to determine if the types of all parameters checked (if any) verify in comparison to the types expected by the retrieved message template. If all types verify or if type checking is not performed, element 912 is next operable to write the generated tokenized message buffer to the tokenized log message file (also supplied to the function of FIG. 9). In either case, element 914 then completes generation of the tokenized log file message entry and returns the completion status to the calling program.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a computing system, a method for manipulating messages in a message log file in a language independent manner comprising the steps of:

generating a first message within a first process of said computing system in a language independent format wherein the step of generating includes the step of generating a message header portion of said first message wherein said message header includes a message ID identifying a corresponding entry in the selected message catalog;

storing said first message in a message log file associated with said first process;

retrieving by a second process said first message from said message log file;

selecting a message catalog associated with said second process wherein said message catalog corresponds to a preferred language of said second process; and translating, within said second process, said first message into a second message encoded in said preferred language in accordance with said message catalog.

2. The method of claim 1 wherein the step of translating includes the steps of:

locating an entry in the selected message catalog corresponding to said message ID of said message header wherein said entry includes a template for translating said first message into said second message; and generating said second message in accordance with the template in the located entry of said selected message catalog.

3. The method of claim 2 wherein the step of generating said first message further includes the step of:

generating a parameter portion of said first message.

4. The method of claim 3 wherein said parameter portion includes at least one parameter value.

5. The method of claim 4 wherein the step of generating said second message includes the steps of:

identifying in the template a variable portion thereof to be replaced by one of said at least one parameter value of said parameter portion of said first message; and substituting said one of said at least one parameter value for said variable portion of the template.

6. The method of claim 4 wherein each of said at least one parameter value is associated with unique positional indicia and wherein the step of generating said second message includes the steps of:

identifying in the template a variable portion thereof to be replaced by an identified one of said at least one parameter value of said parameter portion of said first message wherein said identified one of said at least one parameter value is identified by said unique positional indicia associated with said identified one of said at least one parameter value; and substituting said identified one of said at least one parameter value for said variable portion of the template.

7. The method of claim 3 wherein the step of generating said second message includes the steps of:

identifying in the template a variable portion thereof to be replaced by a special parameter value;

deriving said special parameter value from information in said header portion of said first message; and substituting said special parameter value for said variable portion of the template.

8. The method of claim 3 wherein said parameter portion includes at least one special parameter value and wherein the step of generating said second message includes the steps of:

identifying in the template a variable portion thereof to be replaced by one of said at least one special parameter value; and substituting said one of said at least one special parameter value for said variable portion of the template.

9. The method of claim 3 wherein the step of generating said first message includes the steps of:

parsing said template to determine whether special format specifications for special parameters are present therein; and generating special parameter values in said parameter portion of said first message in response to a determination that said special format specifications are present in said template.

10. The method of claim 9 wherein the step of generating said first message further includes the steps of:

parsing said template to determine whether standard format specifications for standard parameters are present therein; and generating standard parameter values in said parameter portion of said first message in response to a determination that said standard format specifications are present in said template.

11. In a computing system, a method for manipulating tokenized log message entries in a log file comprising the steps of:

generating a tokenized first message having a header portion including a message ID identifying a corresponding language dependent message in a native language message catalog and having a parameter portion;

storing said first message in an entry in said log file;

retrieving said first message from said log file;

locating an entry in said native language message catalog corresponding to said message ID of said first message wherein said entry includes a template for generating a language dependent second message; and generating said second message in accordance with said template in the located entry of said native language message catalog.

12. The method of claim 11 wherein said parameter portion includes at least one parameter value and wherein the step of generating said second message includes the steps of:

identifying in said template a variable portion thereof to be replaced by one of said at least one parameter value of said parameter portion of said first message; and substituting said one of said at least one parameter value for said variable portion of said template.

13. The method of claim 11 wherein said parameter portion includes at least one parameter value and wherein each of said at least one parameter value is associated with a unique positional indicia and wherein the step of generating said second message includes the steps of:

identifying in said template a variable portion thereof to be replaced by an identified one of said at least one parameter value of said parameter portion of said first message wherein said identified one of said at least one parameter value is identified by said unique positional indicia associated with said identified one of said at least one parameter value; and substituting said identified one of said at least one parameter value for said variable portion of said template.

14. The method of claim 11 wherein the step of generating said second message includes the steps of:

identifying in said template a variable portion thereof to be replaced by a special parameter value associated with said first message; and substituting said special parameter value for said variable portion of said template.

15. The method of claim 11 wherein said parameter portion includes at least one special parameter value and wherein the step of generating said second message includes the steps of:

identifying in said template a variable portion thereof to be replaced by one of said at least one special parameter of said parameter portion of said first message; and substituting said one of said at least one special parameter value for said variable portion of said template.

16. In a computing system, a method for presenting tokenized log messages comprising the steps of:

retrieving a tokenized first message from a message log file;

locating an entry in a native language message catalog corresponding to a message ID of said first message wherein said entry includes a template for generating a language dependent second message; and generating said second message in accordance with said template in the located entry of said native language message catalog.

17. The method of claim 16 wherein said first message includes a parameter portion having at least one parameter value and wherein the step of generating said second message includes the steps of:

identifying in said template a variable portion thereof to be replaced by one of said at least one parameter value of said parameter portion of said first message; and substituting said one of said at least one parameter value for said variable portion of said template.

18. A computer readable storage medium tangibly embodying programmed instructions for performing a method for manipulating messages in a message log file in a language independent manner, the method comprising the steps of:

generating a first message within a first process of said computing system in a language independent format wherein the step of generating includes the step of generating a message header portion of said first message wherein said message header includes a message ID identifying a corresponding entry in the selected message catalog;

storing said first message in a message log file associated with said first process;

retrieving by a second process said first message from said message log file;

selecting a message catalog associated with said second process wherein said message catalog corresponds to a preferred language of said second process; and translating, within said second process, said first message into a second message encoded in said preferred language in accordance with said message catalog.

19. The method of claim 18 wherein the step of translating includes the steps of:

locating an entry in the selected message catalog corresponding to said message ID of said message header wherein said entry includes a template for translating said first message into said second message; and generating said second message in accordance with the template in the located entry of said selected message catalog.

20. The method of claim 19 wherein the step of generating said first message further includes the step of:

generating a parameter portion of said first message.

21. The method of claim 20 wherein said parameter portion includes at least one parameter value.

22. The method of claim 21 wherein the step of generating said second message includes the steps of:

identifying in the template a variable portion thereof to be replaced by one of said at least one parameter value of said parameter portion of said first message; and substituting said one of said at least one parameter value for said variable portion of the template.

23. The method of claim 21 wherein each of said at least one parameter value is associated with unique positional indicia and wherein the step of generating said second message includes the steps of:

identifying in the template a variable portion thereof to be replaced by an identified one of said at least one parameter value of said parameter portion of said first message wherein said identified one of said at least one parameter value is identified by said unique positional indicia associated with said identified one of said at least one parameter value; and substituting said identified one of said at least one parameter value for said variable portion of the template.

24. The method of claim 20 wherein the step of generating said second message includes the steps of:

identifying in the template a variable portion thereof to be replaced by a special parameter value;

deriving said special parameter value from information in said header portion of said first message; and substituting said special parameter value for said variable portion of the template.

25. The method of claim 20 wherein said parameter portion includes at least one special parameter value and wherein the step of generating said second message includes the steps of:

identifying in the template a variable portion thereof to be replaced by one of said at least one special parameter value; and substituting said one of said at least one special parameter value for said variable portion of the template.

26. The method of claim 20 wherein the step of generating said first message includes the steps of:

parsing said template to determine whether special format specifications for special parameters are present therein; and generating special parameter values in said parameter portion of said first message in response to a determination that said special format specifications are present in said template.

27. The method of claim 26 wherein the step of generating said first message further includes the steps of:

parsing said template to determine whether standard format specifications for standard parameters are present therein; and generating standard parameter values in said parameter portion of said first message in response to a determination that said standard format specifications are present in said template.

* * * * *